Patented Jan. 17, 1933

1,894,820

UNITED STATES PATENT OFFICE

ALFRED W. GREGG AND RAYMOND H. FRANK, OF COLUMBUS, OHIO, ASSIGNORS TO THE BONNEY-FLOYD COMPANY, OF COLUMBUS, OHIO, A CORPORATION OF OHIO

WEAR RESISTING FERROUS ALLOY

No Drawing. Application filed August 4, 1932. Serial No. 627,536.

This application is a continuation-in-part of our copending application bearing Serial Number 525,032, filed March 24, 1931, in which application we have disclosed novel and improved wear resisting ferrous alloys adapted to be used in the construction and formation of machine parts that are subjected to friction, abrasion, shock, and severe wear.

It has long been known that, for parts of machinery which must withstand severe wear, abrasion and shock, a relatively soft body of material such as steel, coated or surfaced with a much harder material, gives far superior results. The relatively softer body material has ideal properties to withstand shock without fracture, while the very hard surface will withstand the abrasion and wear to which it may be subjected. Cases in which our invention is especially applicable are, among many others, dipper teeth, bucket lips, tool points, well drilling bits, conveyor parts, crushing rolls and so forth. In most cases these parts, are made up of a relatively soft base metal such as cast, rolled or forged carbon or alloy steel which has inferior abrasion resistant properties. Our invention has particular reference to a material for applying a surface or coating on such cast, rolled or forged material to greatly increase its useful life under conditions of severe service.

The alloy to which this invention refers may be cast in suitable form to cover and protect the parts subjected to wear by attaching it thereto by welding, mechanical means or it may be prepared in the form of welding rod and applied to these parts by any welding process such as electric arc welding, oxy-acetylene welding and the like. The latter method is usually preferred, but our invention is not to be limited to this preferred method of application.

In the prior art, high speed steel has commonly been known to contain various proportions of iron, tungsten, chromium and vanadium, the tungsten content being relied upon to give red hardness so that cutting at high speeds with a development of red heat could be successfully accomplished. In such prior proposals, efforts have been made to include nickel, but it had always been found necessary when such nickel was included to have co-present therewith a substantial amount of cobalt, or in the alternative, to increase the tungsten and chromium contents so that they constituted more than 50% of the alloy. In other words, high speed steels and alloys which are well known in the art, depend for their utility upon a definite metallographic structure which includes complex carbides and elements in such proportions that red hardness is an essential characteristic. The present invention, on the other hand, is not directed to an alloy for high speed cutting use, but is adapted to withstand severe abrasion.

It is well known in the art that high speed steels do not have good resistance to shock, which is attested to by the safeguards used in supporting the cutting tool in the lathe. In other words, we wish to distinguish the present invention from the commonly known high speed alloys, as abrasion resistance rather than red hardness is the desired end in view, accompanied by a low fusing temperature adaptable for welding operations. It may also be remarked that the prior art makes reference to iron-nickel-chromium alloys for corrosion resistant purposes, but such compositions have relatively high fusion temperatures and also teach the use of extremely low carbon content. The present invention, on the other hand, is intended to be used for abrasion resistant articles and welding rods to produce coatings of such characteristics on such articles and comprehends a high carbon content and fairly easy fusibility.

We have discovered that an alloy having such desirable characteristics may be produced by combining the following ingredients in these proportions:

| | Per cent |
|---|---|
| Nickel | 25.00 |
| Chromium | 15.00 |
| Tungsten | 16.50 |
| Vanadium | 1.00 |
| Carbon | 2.75 |
| Iron | balance. |

The above represents a preferred embodiment but it will be understood that the percentages of ingredients may be varied within the following ranges, but the preferred embodiment gives a better alloy:

| | Per cent |
|---|---|
| Nickel | 21.00 to 31.00 |
| Chromium | 11.00 to 19.00 |
| Tungsten | 12.00 to 20.00 |
| Vanadium | .50 to 2.00 |
| Carbon | 2.00 to 3.50 |
| Iron | balance. |

Within the above permissible ranges, better results are obtained with the following proportions:

| | Per cent |
|---|---|
| Nickel | 24.00 to 26.00 |
| Chromium | 14.00 to 16.00 |
| Tungsten | 15.00 to 18.00 |
| Vanadium | .75 to 1.25 |
| Carbon | 2.50 to 3.00 |
| Iron | balance. |

The above composition produces a wholly unexpected result as it was formerly believed that the large percentages of alloying ingredients would prevent the formation of a composition having the welding and fusing characteristics hereinabove described.

It will be noted in the production of our improved alloy that nickel constitutes an essential ingredient thereof. Ordinarily high speed tool steels do not contain nickel. Also tool steels usually contain carbon from .70% to 1.00%, whereas in our alloy, the carbon ranges are of the order of from 2.00% to 3.50%. Again, tool steels can be forged whereas the alloy formed in accordance with the present invention can not be.

What is claimed is:

1. A low fusing wear and abrasion resistant alloy consisting of nickel 21% to 31%, chromium 11% to 19%, tungsten 12% to 20%, vanadium .5% to 2.00%, carbon 2.00% to 3.5%, and the balance iron.

2. A low fusing wear and abrasion resistant alloy consisting of nickel 24% to 26%, chromium 14% to 16%, tungsten 15% to 18%, vanadium .75% to 1.25%, carbon 2.50% to 3.00%, and the balance iron.

3. As a new article of manufacture, a welding rod consisting of nickel 21% to 31%, chromium 11% to 19%, tungsten 12% to 20%, vanadium .5% to 2.00%, carbon 2.00% to 3.5%, and the balance iron.

4. As a new article of manufacture, a welding rod consisting of nickel 24% to 26%, chromium 14% to 16%, tungsten 15% to 18%, vanadium .75% to 1.25%, carbon 2.50% to 3.00%, and the balance iron.

In testimony whereof we affix our signatures.

ALFRED W. GREGG.
RAYMOND H. FRANK.